(12) United States Patent
Couvillion et al.

(10) Patent No.: US 8,289,326 B2
(45) Date of Patent: Oct. 16, 2012

(54) IMAGE ANALOGY FILTERS FOR TERRAIN MODELING

(75) Inventors: Warren Carl Couvillion, San Antonio, TX (US); Eric C. Peterson, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 969 days.

(21) Appl. No.: 11/839,961

(22) Filed: Aug. 16, 2007

(65) Prior Publication Data

US 2009/0046095 A1 Feb. 19, 2009

(51) Int. Cl.
- *G06T 17/00* (2006.01)
- *G09G 5/00* (2006.01)
- *G06K 9/46* (2006.01)
- *G06K 9/62* (2006.01)
- *G06K 9/66* (2006.01)
- *G06K 9/68* (2006.01)
- *G06K 9/70* (2006.01)

(52) U.S. Cl. ........ 345/428; 345/587; 345/629; 345/639; 382/195; 382/209; 382/227

(58) Field of Classification Search .......... 345/428, 345/587, 629, 639; 434/36, 41
See application file for complete search history.

(56) References Cited

U.S. PATENT DOCUMENTS

| | | | | |
|---|---|---|---|---|
| 5,067,098 A | * | 11/1991 | Moellering et al. | 345/426 |
| 5,179,638 A | * | 1/1993 | Dawson et al. | 345/582 |
| 5,283,858 A | * | 2/1994 | Moellering et al. | 345/426 |
| 5,333,243 A | * | 7/1994 | Best et al. | 358/1.9 |
| 5,699,497 A | * | 12/1997 | Erdahl et al. | 345/428 |
| 5,748,867 A | * | 5/1998 | Cosman et al. | 715/811 |
| 5,790,130 A | * | 8/1998 | Gannett | 345/587 |
| 6,011,536 A | | 1/2000 | Hertzmann et al. | |
| 6,166,744 A | * | 12/2000 | Jaszlics et al. | 345/629 |
| 6,381,372 B1 | * | 4/2002 | Loce | 382/261 |
| 6,456,288 B1 | * | 9/2002 | Brockway et al. | 345/428 |
| 6,496,189 B1 | * | 12/2002 | Yaron et al. | 345/428 |
| 6,567,087 B1 | * | 5/2003 | Reid | 345/428 |
| 6,600,489 B2 | | 7/2003 | Cook | |
| 6,628,282 B1 | | 9/2003 | Hertzmann et al. | |
| 6,700,573 B2 | | 3/2004 | Freeman | |
| 6,747,649 B1 | | 6/2004 | Sanz-Pastor et al. | |
| 6,864,897 B2 | * | 3/2005 | Brand | 345/582 |
| 6,999,093 B1 | * | 2/2006 | Wetzel et al. | 345/581 |
| 7,106,325 B2 | | 9/2006 | Ritter et al. | |
| 7,129,943 B2 | * | 10/2006 | Zhang et al. | 345/426 |
| 7,161,601 B2 | | 1/2007 | Zhang et al. | |
| 2001/0033330 A1 | * | 10/2001 | Garoutte | 348/153 |
| 2001/0055021 A1 | | 12/2001 | Freeman | |

(Continued)

OTHER PUBLICATIONS

Catania, Luke A., "Scene rendering for the Smart Weapons Operability Enhancement Program", Proceedings of SPIE, vol. 1967, Aug. 13, 1993, pp. 515-524.*

(Continued)

*Primary Examiner* — Daniel Hajnik
*Assistant Examiner* — Roberta D Prendergast
(74) *Attorney, Agent, or Firm* — Grossman, Tucker et al.

(57) ABSTRACT

The present disclosure relates to the development of terrain image analogy filters which may be used to convert visible terrain imagery from a first condition to a second condition. For example, from a seasonal "daytime/summer" view to a "nighttime/winter" appearance. The image analogy filters may be generated using processors such as one or more graphics processing units.

22 Claims, 5 Drawing Sheets

Training Image Pairs

| | | |
|---|---|---|
| Urban Day | ⟵⟶ | Urban Night |
| Rural Day | ⟵⟶ | Rural Night |
| Mountain Summer | ⟵⟶ | Mountain Fall |
| Mountain Summer | ⟵⟶ | Mountain Winter |
| Urban Summer | ⟵⟶ | Urban Fall |
| Rural Summer | ⟵⟶ | Rural Fall |
| Rural Summer | ⟵⟶ | Rural Winter |

U.S. PATENT DOCUMENTS

| | | | | |
|---|---|---|---|---|
| 2003/0108252 | A1* | 6/2003 | Carrig | 382/299 |
| 2004/0233196 | A1 | 11/2004 | Hertzmann | |
| 2005/0084154 | A1* | 4/2005 | Li et al. | 382/190 |
| 2005/0253843 | A1* | 11/2005 | Losasso Petterson et al. | 345/428 |
| 2006/0017740 | A1* | 1/2006 | Coleman | 345/582 |
| 2006/0018565 | A1* | 1/2006 | Davidson et al. | 382/312 |
| 2006/0033825 | A1* | 2/2006 | Li et al. | 348/274 |
| 2006/0038817 | A1* | 2/2006 | Langer | 345/426 |

OTHER PUBLICATIONS

Foley, James D.; van Dam, Andries; Feiner, Steven k.; Hughes, John F.; "Computer Graphics Principles and Practice", © 1996, Addison-Wesley Publishing Company, Second Edition, pp. 590-592 and 595-598.*

Sylvain Lefebvre and Hugues Hoppe, 2005, "Parallel controllable texture synthesis", ACM Transactions on Graphics (TOG), vol. 24, Issue 3 (Jul. 2005), pp. 777-786.*

Sylvain Lefebvre, Apr. 27, 2007, "Part IV: runtime texture synthesis", In ACM SIGGRAPH 2007 courses (SIGGRAPH '07). ACM, New York, NY, USA, Article 4, 67 pages.*

Hiroyuki Takizawa and Hiroaki Kobayashi, "Hierarchical parallel processing of large scale data clustering on a PC cluster with GPU co-processing", Journal of Supercomputing, vol. 36, No. 3, Jun. 2006, pp. 219-234.*

Woodard, T., 2005, "Real-time GPU-based texture synthesis", Presented at the IMAGE Conference, Scottsdale, Arizona, Jul. 2005, 8 pages.*

Monotonic-definition, Merriam Webster online dictionary, retrieved on Dec. 19, 2011 from: http://www.merriam-webster.com/dictionary/monotonic.*

"Image Analogies: texture-By-Numbers: Flight Simulator Terrain," http://mrl.nyu.edu/projects/image-analogies/flightsim/html. (3 pages), Aug. 16, 2007.

Cohen, et al., "Photorealistic Terrain Imaging and Flight Simulation," IEEE Computer Graphics and Applications, 0272-17-16/94, Mar. 1994, pp. 10-12 (3 pages).

Paget, et al., "Texture Synthesis via a Non-parametric Markov Random Field," Department of Electrical and Computer Engineering, University of Queenland, and the Cooperative Research Centre for Sensor, Signal, and Information Processing QLD 4072, Australia (7 pages), 1995.

Bustos, et al., "A Graphics Hardware Accelerated Algorithm for Nearest Neighbor Search," Department of Computer and Information Science, University of Konstanz, Computational Science—ICCS 2006: 6th International Conference, Reading, UK; May 28-31, 2006, Proceedings, Part IV (4 pages).

Salisbury, et al., "Orientable Textures for Image-Based Pen-and-Ink Illustration," University of Washington, SIGGRAPH 2001 Conference Proceedings, pp. 401-406, Aug. 2001 (6 pages).

Hertzmann, et al., "Image Analogies," SIGGRAPH 2001 Conference Proceedings, Aug. 2001, pp. 327-340 (14 pages).

Vanburen, "Graphical Processing Units," Advanced Computer Architecture, Nov. 10, 2004, http:/www.rit.edu/~bqv5143/ (12 pages).

Arya et al., "An Optimal Algorithm for Approximate Nearest Neighbor Searching in Fixed Dimensions," Proceedings of the Fifth Annuak ACM-SIAM Symposium on Discrete Algorithms, 1994 (33 pages).

Couvillion, Jr., et al., "An IR&D Proposal for Using Image Analogies for Rapid Generation of Terrain for Simulations," Jan. 31, 2007.

* cited by examiner

Training Image Pairs

| | | |
|---|---|---|
| Urban Day | ⟷ | Urban Night |
| Rural Day | ⟷ | Rural Night |
| Mountain Summer | ⟷ | Mountain Fall |
| Mountain Summer | ⟷ | Mountain Winter |
| Urban Summer | ⟷ | Urban Fall |
| Rural Summer | ⟷ | Rural Fall |
| Rural Summer | ⟷ | Rural Winter |

*FIG. 1*

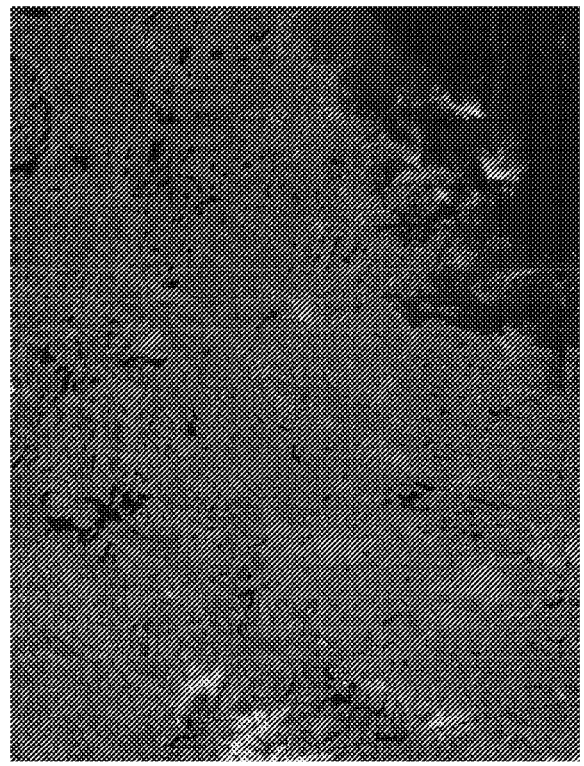
*Fall*
FIG. 3B
*Training Pair*
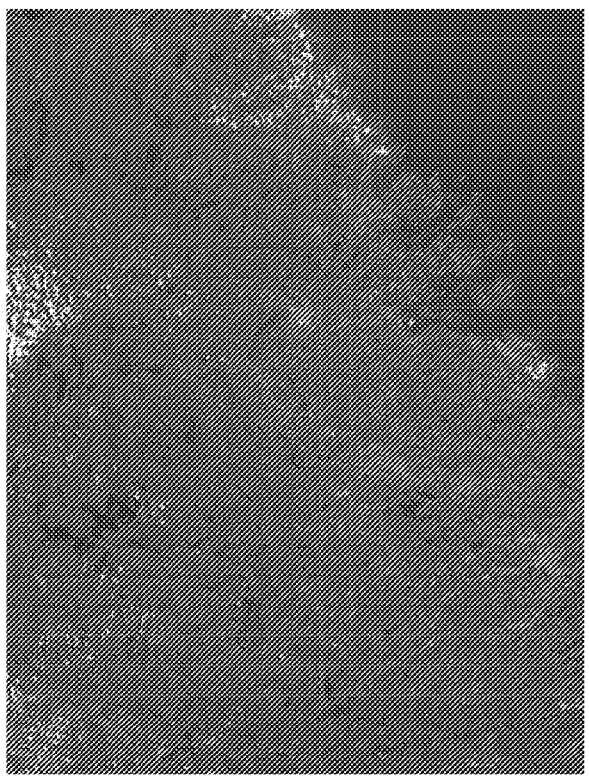
*Summer*
FIG. 3A

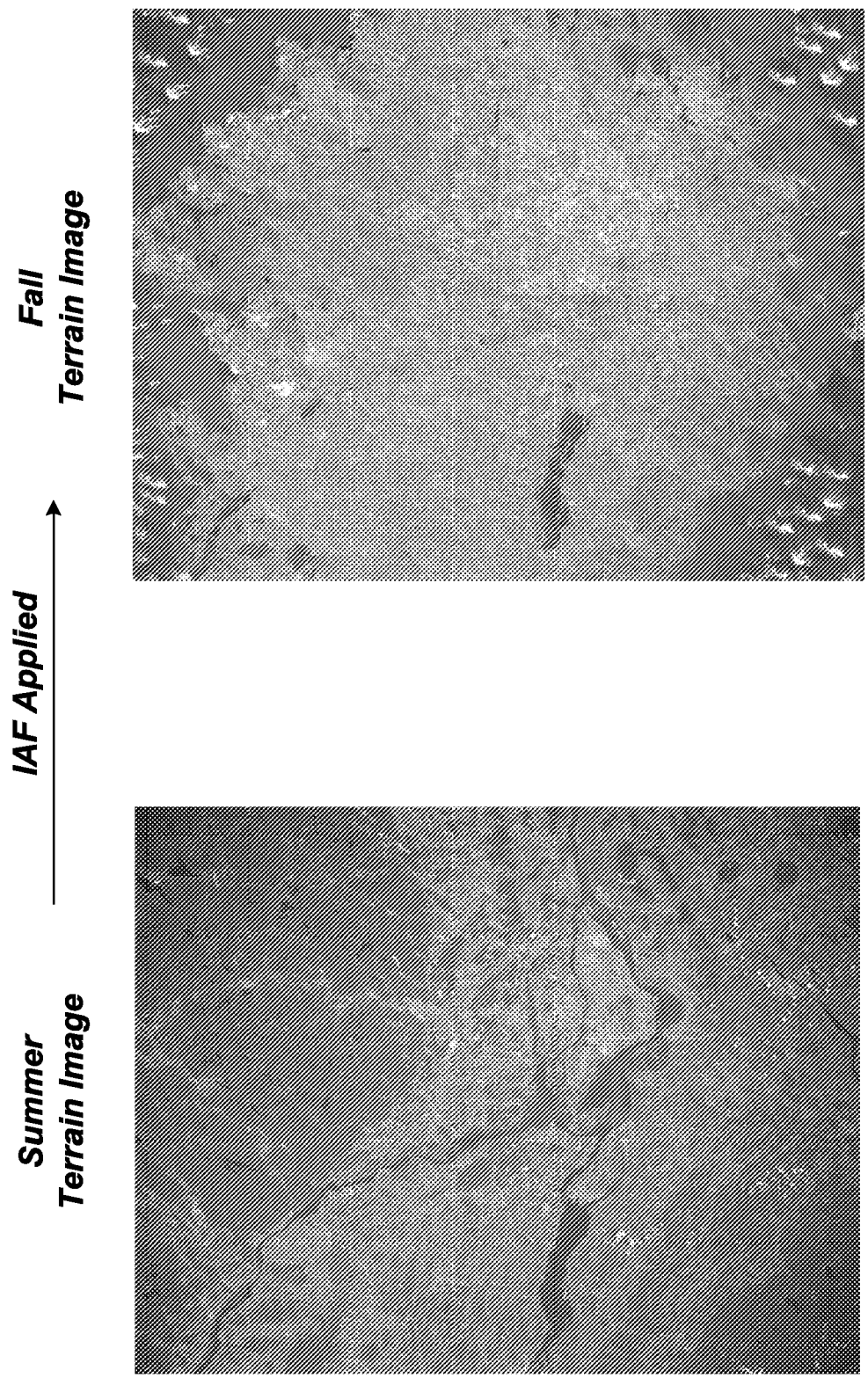

IMAGE ANALOGY FILTERS FOR TERRAIN MODELING

FIELD OF THE INVENTION

This disclosure relates to the development of image analogy filters which may be used to convert visible terrain imagery from a first condition (e.g. daytime/summer) to a second condition (nighttime/winter).

BACKGROUND

Terrain modeling for training and simulation applications may typically be generated using a combination of satellite imagery and terrain elevation data. Typically, due to the relatively high cost of generating and processing satellite data, the imagery employed in such modeling may be limited to the same general time of day and season, e.g., daytime during summer. To provide terrain modeling for nighttime scenarios or during seasons other than summer, available satellite imagery may be modified by hand, which may require extensive human input and potentially hundreds or thousands of images.

SUMMARY

The present disclosure relates in one embodiment to a method comprising providing first and second terrain images forming a terrain image training pair wherein the first terrain image includes pixels p and the second terrain image includes pixel p'. One may then provide a starting terrain image wherein the starting terrain image includes one or more pixels q wherein pixels p, p' and q have one or more features and associated values. One may then form training images and starting images at L levels of resolution by replacing sets of pixels with weighted average of their values, wherein the L levels of resolution includes a plurality of images wherein each image is at a selected resolution from a relatively higher resolution to a relatively lower resolution. For each individual resolution level l within the L levels of resolution, from lowest relative resolution to highest relative resolution and for each pixel q' for an output image to be created at level L, one may: (i) find pixels p and p' in the training images that match a pixel q in a starting image and any computed pixels q'; (ii) set a value of the output image features at q' to a value of the second training image at p'. This may be repeated followed by creating an output image of pixels q' at level L.

The present disclosure also relates, in another embodiment, to an article comprising a storage medium having stored thereon instruction that when executed by a machine result in the following operations: receiving first and second terrain images forming a terrain image training pair wherein the first terrain image includes pixels p and the second terrain image includes pixel p' and receiving a starting terrain image wherein the starting terrain image includes one or more pixels q wherein pixels p, p' and q have one or more features and associated values. The article may then form training images and starting images at L levels of resolution by replacing sets of pixels with weighted average of their values, wherein the L levels of resolution includes a plurality of images wherein each image is at a selected resolution from a relatively higher resolution to a relatively lower resolution. For each individual resolution level I within the L levels of resolution, from lowest relative resolution to highest relative resolution and for each pixel q' for an output image to be created at level L, the article may: (i) find pixels p and p' in the training images that match a pixel q in a starting image and any computed pixels q'; (ii) set a value of the output image features at q' to a value of the second training image at p'. This may be repeated followed by creating an output image of pixels q' at level L.

BRIEF DESCRIPTION OF THE DRAWINGS

FIG. 1 identifies examples of terrain training image pairs that may be employed to generate an image analogy filter.

FIGS. 3A and 3B provide an example of seasonal terrain images that may be utilized to generate an image analogy filter.

FIG. 4 provides an example of the use of a terrain image analogy filter using the training pair shown in FIGS. 3A and 3B.

DETAILED DESCRIPTION

Figure 2B:
FIGS. 2A and 2B provide an example of actual daytime and nighttime image pairs that may be utilized to generate an image analogy filter.

As noted above, the present disclosure relates to the development of image analogy filters (IAFs) for terrain modeling. The IAFs may be generated using one or more parallel graphics processing units (GPUs). A GPU may be understood to be a dedicated graphics rendering device for a personal computer, workstation or game console. A GPU may therefore be specifically designed to process graphics data, such as three-dimensional (3D) data that may be utilized for the terrain images and IAFs. A GPU may also be utilized for general-purpose parallel computation and may provide higher computational throughput across relatively large amounts of data than may be available on a general purpose CPU (Central Processing Unit). The IAF may be understood herein as a non-linear image filter that may be derived from the analysis of a collection of terrain training images. The IAF so generated may then be utilized to convert a visible terrain image from a first condition to a second condition.

Training imaging pairs that are contemplated herein may first include those training image pairs that may be provided by imaging a given terrain location at two different chronological time periods (e.g. day/night) and/or at two different seasonal environmental conditions (e.g. summer/winter). Reference to terrain may be understood herein as reference to surface features of a given land or water mass, that may include natural features as well as man-made features. Such surface features may therefore be identified according to elevation, surface normal and/or orientation and/or color and/or luminance at one or more selected locations.

Day and night may itself be understood, e.g., as one image taken at 12:00 P.M. and one image taken at 12:00 A.M. Such images may include satellite imagery. Furthermore, the training pairs may be geographically regionalized, e.g., urban (minimum density of 400 persons per square kilometer), rural (less than 400 persons per square kilometer), mountain (terrain with one or more peaks at 2000 feet or more above sea level) and/or desert (e.g. average annual precipitation of less than 250 mm (10 in)).

For example, as illustrated in FIG. 1, the training image pairs herein may include: urban day/urban night; rural day/rural night; mountain summer/mountain fall; mountain summer/mountain winter; urban summer/urban fall; rural summer/rural fall; rural summer/rural winter. The training pairs herein may also include other image combinations, which may have particular utility as applied to projecting the influence of environmental type damage (e.g. flooding). It is contemplated, for example, that the image combinations that may be considered may include pre- and post-attack battle damage assessment photographs which may then be employed to develop battle-damaged terrain image filters. In addition, it is also contemplated herein that the terrain image pairs suitable for use as training images may include hand-drawn images using applicable image processing and/or image software.

Figure 2A:
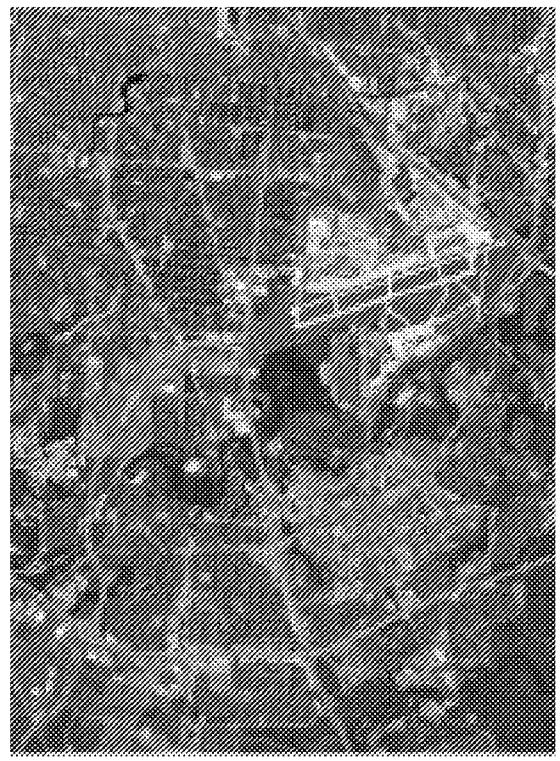

Attention is therefore directed to FIG. 2A which now provides one example of a daytime aerial satellite image of a selected urban region. FIG. 2B shows the same image manipulated utilizing photo-editing software to simulate the same terrain as it may appear at night. As may be appreciated, an actual nighttime image may also be utilized. Such image pairs may therefore serve herein as "training images" for which an image analogy filter may be derived. That is, with respect to FIGS. 2A and 2B, one may generate an IAF that when applied other urban daytime regions, such IAF will convert such daytime region image to a nighttime image.

The generation of any given IAF for the above referenced terrain modeling may be provided through the use of the following image analogy algorithm, which as alluded to above, may be run on multiple graphics processing units, to thereby make use of parallel processing, which may therefore reduce calculation time relative to a central processing unit (CPU). That is, each of the GPUs can be assigned a separate portion of the image (e.g. different collections of pixels and/or different elements of feature vectors) to be synthesized. The data structures that may be employed for the algorithm include 2D arrays of scalars (a one-dimensional value) and vectors (multi-dimensional values) that may be stored in the GPU texture memory.

For purposes of the following it may be understood that a training pair may include first and second terrain training images that may be used to develop a terrain image analogy filter. In addition, a starting terrain image may be understood as that image for which an output terrain image may be derived, which output terrain image may be formed by application of the terrain image analogy filter to the starting terrain image. The image analogy algorithm may now be summarized as follows:
  1. Create a total of L levels of resolution [i.e., create lower resolution images of a training pair and a starting image from higher resolution images by replacing sets of pixels with weighted averages of their values]. An example of a weighted average may be understood to be Gaussian pyramid which may be further understood as a successive local averaging of pixels (i.e. a selected number of pixels, such as 9, 25, etc).
  2. Determine features of training images and starting image for the pixels "p" and "p'" within the training images and pixels "q" within the starting image. It may be appreciated that a pixel p in a first training image may correspond to a pixel p' in a second training image where p and p' may be at the same location in the two images. Examples of the features for consideration are described below.
  3. For each individual resolution level "l" from lower resolution to highest:
    (a) For each pixel q' in the filtered (output) image being created:
      (i) Find the pixels, p, p' in the training image pair that best match (see below) the starting image pixel q and what may have been computed of the filtered (output) image at q'. Similar to the above, a pixel q in the starting image may have one to one correspondence with a pixel q' in the filtered (output) image being created.
      (ii) Set the value of the filtered (output) image at q' to the value of the second training image at p'. Value may be understood to mean the scalars and/or vectors noted above.
      (iii) Store the spatial relationship of p' to q'.

It may be appreciated that steps 3(a)(i) through 3(a)(iii) above may be repeated for each pixel q' at a resolution level l. In other words, an intermediate filtered image may be created for each resolution level l. A filtered image at a highest desired resolution L may be a final output.

It may be noted that the features mentioned in step (2) may include color in red-green-blue (RGB) space (a vector) and/or the luminance (e.g. brightness) of the pixels. Other features may include color in hue-saturation-value (HSV) space, surface normals of the terrain and terrain elevation by pixel. Reference to HSV space may be understood as the HSV model which may define a color space in terms of three constituent components: 1. Hue or color type (such as red, blue or yellow) which may range from 0-360, where each value may correspond to a color. For example 0 may be red, 45 a shade of orange and 55 a shade of yellow. It may be appreciated that to enhance computational speed, hue may be converted to a range from 0 to 255 using the relation:

$$\text{Hue}_{computation} = (\text{Hue}_{HSVmodel}/360)*255.$$

Accordingly, using the $\text{Hue}_{computation}$ scale, 0 may be red, 32 a shade of orange and 40 a shade of yellow; 2. Saturation or intensity, which may range from 0-100%, where 0 means no color and 100 means intense color; 3. Value or brightness of the color, which may also range from 0-100%, where 0 is always black and 100 may be white.

It may be appreciated that surface normal maps and height fields may be output from modeling packages such as 3DS MAX™ (available from Autodesk Inc.) and LIGHTWAVE™ (available from NewTek Inc.) which are computer programs that may be used for 3D modeling, animation and rendering (the process of generating an image from a model). In addition, determining the sets of pixels in step (i) or "best match" may include computing two candidates. The first candidate may be a best approximate match, which may then include an approximate nearest neighbor (ANN) search. It may be appreciated that an ANN search may include a nearest neighbor search which may return the pixels p, p', that best match the pixel q'. The second candidate may be to consider the pixel value that may best preserve coherence from a neighborhood of synthesized pixels around the pixel under consideration. As noted above, in 3(a)(i), the algorithm may utilize a best match protocol. An exemplary process of finding the pixels, p, p', in the training image pair that best match the starting image and what may have been computed of the filtered (output) image at q' may be described as follows. Inputs to the best match protocol may include the vector and/or scalar values, at resolution level l, for the training image pair, the starting image and the portion of the filtered output image that may have been computed. In addition, input to the best match protocol may include the spatial relationships between p, p' and q, q', the resolution level l and the location of pixel q'. The best match may then be calculated by finding the pixels p, p', that best match the pixels q, q' using, for example, an approximate nearest neighbor (ANN) search, a coherence search or a combination wherein a best match is selected from the results of the approximate nearest neighbor search and the coherence search.

An approximate nearest neighbor (ANN) search algorithm may be understood as an algorithm that may accept as input a vector v (e.g. RGB values, HSV values, elevations, surface normals, etc.) of dimension d (i.e. the number of values associated with the vector v) that may be associated with pixel q of a starting image. The input vector v may be a concatenation of the feature vectors of the starting image and the output image for a neighborhood of pixels q, q' at the resolution level l and the next coarser level l-1. It may be noted that the neighborhood of q' of the filtered image for a resolution level l may include only the portion of the image that has already been computed.

The ANN may then compare the vector v to a vector space including a plurality of pre-existing vectors (a set of vectors, e.g. those vectors that may define a training image and/or starting image) also of dimension d. A first plurality of pre-existing vectors may include the concatenation of all feature vectors within a neighborhood of the pixels p, p' of the training images at the current resolution level l and coarser resolution level l-1. For example, the neighborhood for the current resolution level l may include a five-by-five array of pixels. The neighborhood for the next coarser resolution level l-1 may include a three-by-three array of pixels.

The ANN may then return the pixels p, p', of the training images having an associated pre-existing vector that most closely approximates the vector v associated with pixel q of a starting image, according to a predetermined metric, e.g., distance. The distance may be calculated, for example, by calculating, for each pre-existing vector, the square root of the sum of the squares of the differences between the values of each dimension of the input vector v associated with pixels q, q', and the corresponding dimension of the pre-existing vector associated with pixels p, p'. For example, for a pre-existing vector w, a distance calculation equation may be:

$$\text{Distance} = \sqrt{\sum_{i=0}^{d-1} (v_i - w_i)^2}$$

where i corresponds to a dimension of the input vector v and the pre-existing vector w.

The nearest neighbor may then be the pre-existing vector that yields the smallest distance. It may be appreciated that the ANN search algorithm may compute a distance which may be a numerical sum of the squares of the differences between the values of each dimension. In another embodiment, the distance may be calculated, for example, by calculating, for each pre-existing vector, the sum of the absolute values of the differences between the values of each dimension of the input vector v associated with pixels q, q', and the corresponding dimension of the pre-existing vector associated with pixels p, p'. For example, for a pre-existing vector w, this distance calculation equation may be:

$$\text{Distance} = \sum_{i=0}^{d-1} |v_i - w_i|$$

where i corresponds to a dimension of the input vector v and the pre-existing vector w.

It may also be appreciated that the ANN algorithm noted above may be implemented on a GPU that may then calculate the distances in parallel. For example, each dimension of the plurality of pre-existing vectors, may be stored in a corresponding texture of a GPU. In other words, the plurality of pre-existing vectors wherein each vector has dimension d, may then correspond to d textures, where each texture may correspond to a dimension of the plurality of pre-existing vectors. A texture may include a plurality of texels. A texel may be understood to mean a texture element. A texture may then include a 2D array of texels. Each texel may itself include up to four values. When the GPU is used as a graphics processor, the four values may correspond to Red-Green-Blue color plus A (an alpha value). It may then be appreciated that each texel may contain up to four values.

When the GPU is used to implement an ANN algorithm, the four values may correspond to a dimension of each of four vectors in the plurality of pre-existing vectors. For example, for a vector space that may include eight vectors, e.g., v1, v2, v3, . . . , v8 where each vector may have dimension three, e.g., d1, d2, d3, a first texture may include two texels where a first texel may contain four values for d1 that may be associated with v1, v2, v3, and v4, respectively, and a second texel may likewise contain four values for d1 that may be associated with v5, v6, v7 and v8, respectively. A second texture may also include two texels where a first texel may contain four values for d2 that may be associated with v1, v2, v3, and v4, respectively, and a second texel may likewise contain four values for d2 that may be associated with v5, v6, v7 and v8, respectively.

Calculation of an ANN for an input vector v may proceed as follows. The distances between the input vector v and the plurality of pre-existing vectors may be calculated iteratively in parallel for subsets of dimensions of the plurality of pre-existing vectors. It may be appreciated that calculating distances in parallel may provide a relatively faster calculation than calculating the distances sequentially. The iterations may be repeated until the distances for all the dimensions have been calculated. The distances that may be calculated for the subsets of dimensions for each iteration may be added to a value in a result texture. The values in the result texture may be initialized to zero. At the completion of the final iteration, the result texture may contain the distances between the input vector and the plurality of pre-existing vectors. It may be appreciated that each texel in the result texture may contain such distances for up to four pre-existing vectors.

A minimum distance may then be calculated for each texel in the result texture. The minimum distance may be stored in the Red value of each texel and an index corresponding to the pre-existing vector associated with this minimum distance may be stored in the Green value of the texel. A minimum distance may then be calculated for each group of four texels. This minimum distance and its associated index may then be stored in one of the four texels. The remaining three texels of the four may not be included in further distance calculations. This process may continue, iteratively, until one texel remains that contains the minimum distance between the input vector and the plurality of pre-existing vectors and the index associated with the pre-existing vector that may correspond to the minimum distance.

It may be appreciated that the above process for calculating a minimum distance between an input vector and a plurality of pre-existing vectors utilizing a GPU may exploit the parallel processing capabilities of the GPU. It may then be appreciated that the parallel processing may provide a result relatively more quickly than purely sequential calculations.

In another embodiment, a preprocessing algorithm may sort the plurality of pre-existing vectors prior to calculating the distances between the input vector and the plurality of pre-existing vectors. For example, a distance may be calculated between each dimension of the input vector and each corresponding dimension of each of the plurality of pre-existing vectors. Each distance may have an index indicating the associated pre-existing vector. The distances associated with each dimension may be combined into a sequence that may then be sorted, using, for example, a binary sort. A binary sort may be understood to mean a sort wherein an initial sequence may be successively divided in half and may, therefore yield two new sequences each having half as many elements as the prior sequence. After each division, elements of the first new sequence may be then compared to corresponding elements in the second new sequence, element by element. For example, the element having a larger value may be stored in the first new sequence and the element having a smaller value may be stored in the second new sequence. A final result may be a sorted initial sequence that may be monotonic over the entire sequence or monotonic over each of two halves of the initial sequence.

It may then be appreciated that a sorted sequence of distances, for each dimension, may have a corresponding sequence of sorted indices wherein the indices indicate the pre-existing vector associated with each distance. For example, each sequence of sorted indices may indicate, in order, the pre-existing vector corresponding to the smallest distance for that dimension to the pre-existing vector corresponding to the largest distance for that dimension. It may be appreciated that the minimum distance in each of the sorted sequence may represent an ANN for that dimension. An ANN for the input vector may be determined using a search, for example a linear search, beginning with these sorted sequences. The search may be complete when a distance for each dimension has reached a predefined value. In another embodiment, the search may be complete when each index has reached a predefined value. It may be appreciated that by sorting the distances by dimension, a smaller neighborhood may be searched that may yield the pre-existing vector that may provide the minimum distance from the input vector.

A coherence search may be understood as comparing the input vector v (defined above) with a second plurality of pre-existing vectors in a vector space that includes a neighborhood of pixels adjacent to pixel q, q' that has been computed for the filtered image. The coherence search may then identify a pixel p' that corresponds to a pixel associated with a pre-existing vector in the neighborhood of pixel q' that most closely matches the input vector v according to a predetermined metric. It may therefore be noted that the ANN search (described above) may yield a result wherein the feature vectors match relatively more closely than the coherent search results. However, coherent pixels (pixels that are selected as a result of the coherent search) may provide a better overall perceptual similarity. Once the ANN search and coherence search are completed, the coherence search result may be compared against a weighted ANN search result. Weighting may be understood to bias the results to select the coherence result over the ANN result to, as noted, provide relatively improved perceptual correspondence.

With attention to FIGS. 3A and 3B, an example of a terrain training pair is provided, which illustrates seasonal differences in terrain from Summer→Fall. Utilizing the terrain training pair in FIGS. 3A and 3B, and the methods for generating a terrain image analogy filter noted herein, the filter was applied to the Summer Terrain Inage in FIG. 4A to produce the Fall Terrain Image in FIG. 4B.

Figure 5:
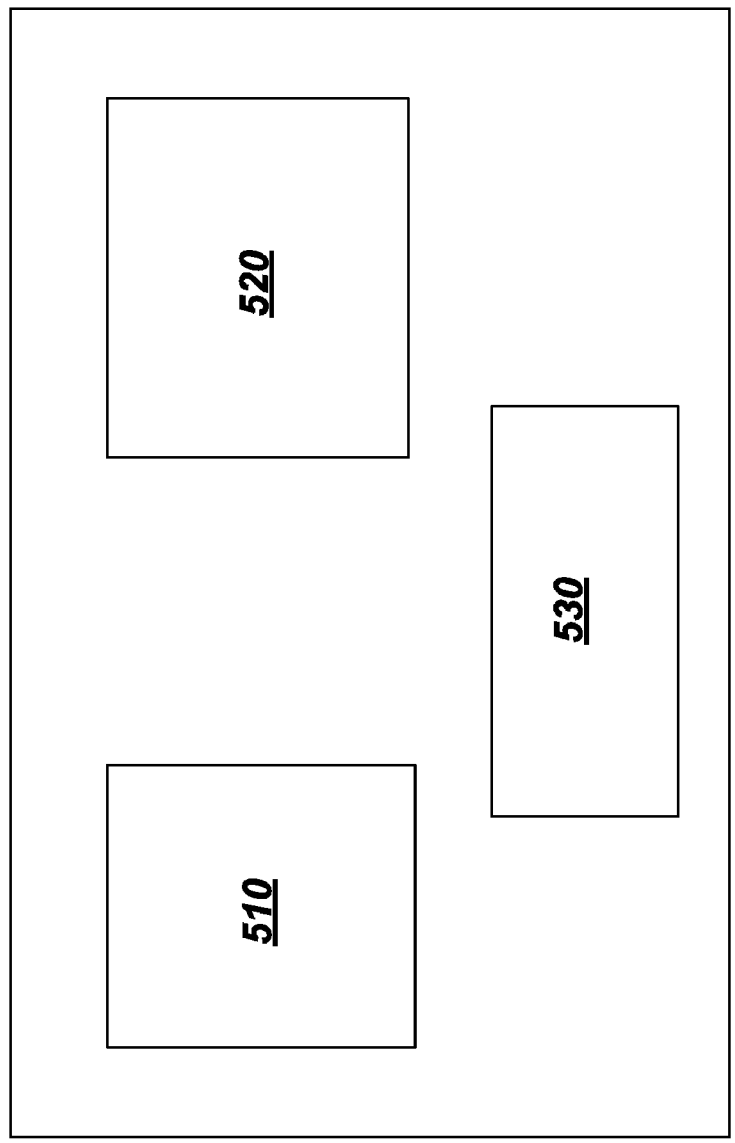
FIG. 5 illustrates an example of a system for generating image analogy filters for terrain modeling that contains a processor, machine readable media and a user interface.

It should also be appreciated that the functionality described herein for the embodiments of the present invention may be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 5, the system for generating image analogy filters for terrain modeling may contain a processor (510) and machine readable media (520) and user interface (530).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A method comprising:
providing first and second terrain images forming a terrain image training pair wherein said first terrain image includes pixels p and said second terrain image includes pixels p', and wherein said first and said second terrain images are images of a same terrain location obtained at two different chronological time periods;
providing a starting terrain image wherein said starting terrain image includes one or more pixels q;
wherein pixels p, p' and q have one or more features and associated values;
forming training images and starting images at L levels of resolution by replacing sets of pixels with weighted average of their values, wherein said L levels of resolution includes a plurality of images wherein each image is at a selected resolution from a relatively higher resolution to a relatively lower resolution;
for each individual resolution level l within said L levels of resolution, from lowest relative resolution to highest relative resolution and for each pixel q' for an output image to be created at level L:
  (i) finding pixels p and p' in said training images that match a pixel q in a starting image and any computed pixels q' wherein said finding is performed in parallel in a graphics processing unit (GPU), said finding comprising:
    (a) inputting, to said GPU, a vector v of dimension d having at least one feature associated with said pixels q of the starting image and any computed pixels q' of said output image;
    (b) sorting a plurality of pre-existing vectors, wherein each pre-existing vector of said plurality of pre-existing vectors is associated with respective pixels p and p', each pre-existing vector has d dimensions and wherein said sorting comprises determining a distance between each dimension of said input vector v and each corresponding dimension of each of the plurality of pre-existing vectors, each distance having an index indicating said associated pre-existing vector; and sorting said distances and associated indexes for each dimension into distance sequences and corresponding index sequences wherein each said sequence of distances is monotonically increasing or monotonically decreasing over the entire sequence;

(c) storing said plurality of pre-existing vectors in said GPU, wherein a value of one associated feature corresponding to one dimension of said d dimensions of each pre-existing vector is stored in a corresponding texture of said GPU so that each said corresponding texture stores a plurality of values of said one associated feature of said plurality of pre-existing vectors;

(d) determining a pre-existing vector w, of said plurality of pre-existing vectors associated with said pixels p and p', that most closely approximates the vector v associated with pixels q of the starting image and any computed pixels q' of said output image, according to a predetermined metric;

(ii) setting a value of said output image features at q' to a value of the second training image at p' associated with said pre-existing vector w; and creating an output image of pixels q' at level L.

2. The method of claim 1 wherein said weighted averages are determined by a Gaussian pyramid.

3. The method of claim 1 wherein said features comprise color in red-green-blue space within said terrain images.

4. The method of claim 1 wherein said features comprise color in hue-saturation-value space within said terrain images.

5. The method of claim 1 wherein said features comprise surface normals within said terrain images.

6. The method of claim 1 wherein said features comprise elevations within said terrain images.

7. The method of claim 1 wherein said feature comprises luminance within said terrain images.

8. The method of claim 1 wherein said finding pixels p and p' in the training image pair that match said starting image pixels q and any computed pixels q' of said output image comprises:
comparing the vector v to vectors associated with pixels p and p' of the training images.

9. The method of claim 1 wherein said predetermined metric comprises distance.

10. The method of claim 1 wherein said finding pixels p and p' in the training image pair that matches said starting image pixels q and any computed pixels q' of said output image comprises:
comparing the vector v to vectors associated with pixels q of the starting image and any computed pixels q' of said output image.

11. The method of claim 1 wherein said determining said pre-existing vector w that most closely approximates the vector v is performed on a subset of said plurality of pre-existing vectors.

12. An article comprising a non-transitory storage medium having stored thereon instruction that when executed by a machine result in the following operations:
receiving first and second terrain images forming a terrain image training pair wherein said first terrain image includes pixels p and said second terrain image includes pixel p', and wherein said first and said second terrain images are images of a same terrain location obtained at two different chronological time periods;
receiving a starting terrain image wherein said starting terrain image includes one or more pixels q;
wherein pixels p, p' and q have one or more features and associated values;
forming training images and starting images at L levels of resolution by replacing sets of pixels with weighted average of their values, wherein said L levels of resolution includes a plurality of images wherein each image is at a selected resolution from a relatively higher resolution to a relatively lower resolution;
for each individual resolution level l within said L levels of resolution, from lowest relative resolution to highest relative resolution and for each pixel q' for an output image to be created at level L:

(i) finding pixels p and p' in said training images that match a pixel q in a starting image and any computed pixels q' wherein said finding is performed in parallel in a graphics processing unit (GPU), said finding comprising:

(a) inputting, to said GPU, a vector v of dimension d having at least one feature associated with said pixels q of the starting image and any computed pixels q' of said output image;

(b) sorting a plurality of pre-existing vectors, wherein each pre-existing vector of said plurality of pre-existing vectors is associated with respective pixels p and p', each pre-existing vector has d dimensions and wherein said sorting comprises determining a distance between each dimension of said input vector v and each corresponding dimension of each of the plurality of pre-existing vectors, each distance having an index indicating said associated pre-existing vector; and sorting said distances and associated indexes for each dimension into distance sequences and corresponding index sequences wherein each said sequence of distances is monotonically increasing or monotonically decreasing over the entire sequence;

(c) storing said plurality of pre-existing vectors in said GPU, wherein a value of one associated feature corresponding to one dimension of said d dimensions of each pre-existing vector is stored in a corresponding texture of said GPU so that each said corresponding texture stores a plurality of values of said one associated feature of said plurality of pre-existing vectors;

(d) determining a pre-existing vector w, of said plurality of pre-existing vectors associated with said pixels p and p', that most closely approximates the vector v associated with pixels q of the starting image and any computed pixels q' of said output image, according to a predetermined metric;

(ii) setting a value of said output image features at q' to a value of the second training image at p' associated with said pre-existing vector w; and creating an output image of pixels q' at level L.

13. The article of claim 12 wherein said weighted averages are determined by a Gaussian pyramid.

14. The article of claim 12 wherein said features comprise color in red-green-blue space within said terrain images.

15. The article of claim 12 wherein said features comprise color in hue-saturation-value space within said terrain images.

16. The article of claim 12 wherein said features comprise surface normals within said terrain images.

17. The article of claim 12 wherein said features comprise elevations within said terrain images.

18. The article of claim 12 wherein said feature comprises luminance within said terrain images.

19. The article of claim 12 wherein said finding pixels p and p' in the training image pair that matches said starting image pixels q and any computed pixels q' of said output image comprises:
comparing the vector v to vectors associated with pixels p and p' of the training images.

20. The article of claim 19 wherein said predetermined metric comprises distance.

21. The article of claim 12 wherein said finding pixels p and p' in the training image pair that match said starting image pixels q and any computed pixels q' of said output image comprises:
- comparing the vector v to vectors associated with pixels q of the starting image and any computed pixels q' of said output image.

22. The article of claim 12 wherein said determining said pre-existing vector w that most closely approximates the vector v is performed on a subset of said plurality of pre-existing vectors.

* * * * *